United States Patent [19]

Lee

[11] 4,327,666
[45] May 4, 1982

[54] VEHICLE WITH SPRAY MEANS

[76] Inventor: Francis H. Lee, Little Stanneylands Farm, Stanneylands Rd., Wilmslow, Cheshire, England

[21] Appl. No.: 150,531

[22] Filed: May 16, 1980

[30] Foreign Application Priority Data

May 16, 1979 [GB] United Kingdom ............... 17055/79

[51] Int. Cl.³ ............................................... B05C 5/00
[52] U.S. Cl. .................................... 118/679; 118/72; 118/307; 239/184; 15/21 E
[58] Field of Search .............. 118/305, 663, 307, 708, 118/207, 668, 208, 676, 72, 679, 73; 239/184, 178; 15/21 E, 77

[56] References Cited

U.S. PATENT DOCUMENTS

| | | | |
|---|---|---|---|
| 3,108,301 | 10/1963 | Jones | 118/208 X |
| 3,298,352 | 1/1967 | Vrablzk | 118/305 X |
| 3,459,373 | 8/1969 | Koers | 239/178 X |
| 3,532,070 | 10/1970 | Lamarque | 118/305 X |
| 3,687,371 | 8/1972 | Swager | 118/305 X |
| 4,197,998 | 4/1980 | Jolly, Jr. | 118/305 X |

Primary Examiner—John P. McIntosh
Attorney, Agent, or Firm—Sughrue, Mion, Zinn, Macpeak and Seas

[57] ABSTRACT

A motorized vehicle for effecting a spraying operation onto an elongate structure (e.g. a roadway crash barrier) as the vehicle travels alongside said structure has an arm extendable transversely of the vehicle and provided with spray means for effecting said spraying operation associated with means for following the elongate structure so that the spray is always directed towards the structure. The vehicle also has a tank for holding a medium to be sprayed by the spray means, and means for supplying said medium under pressure to the spray means.

13 Claims, 5 Drawing Figures

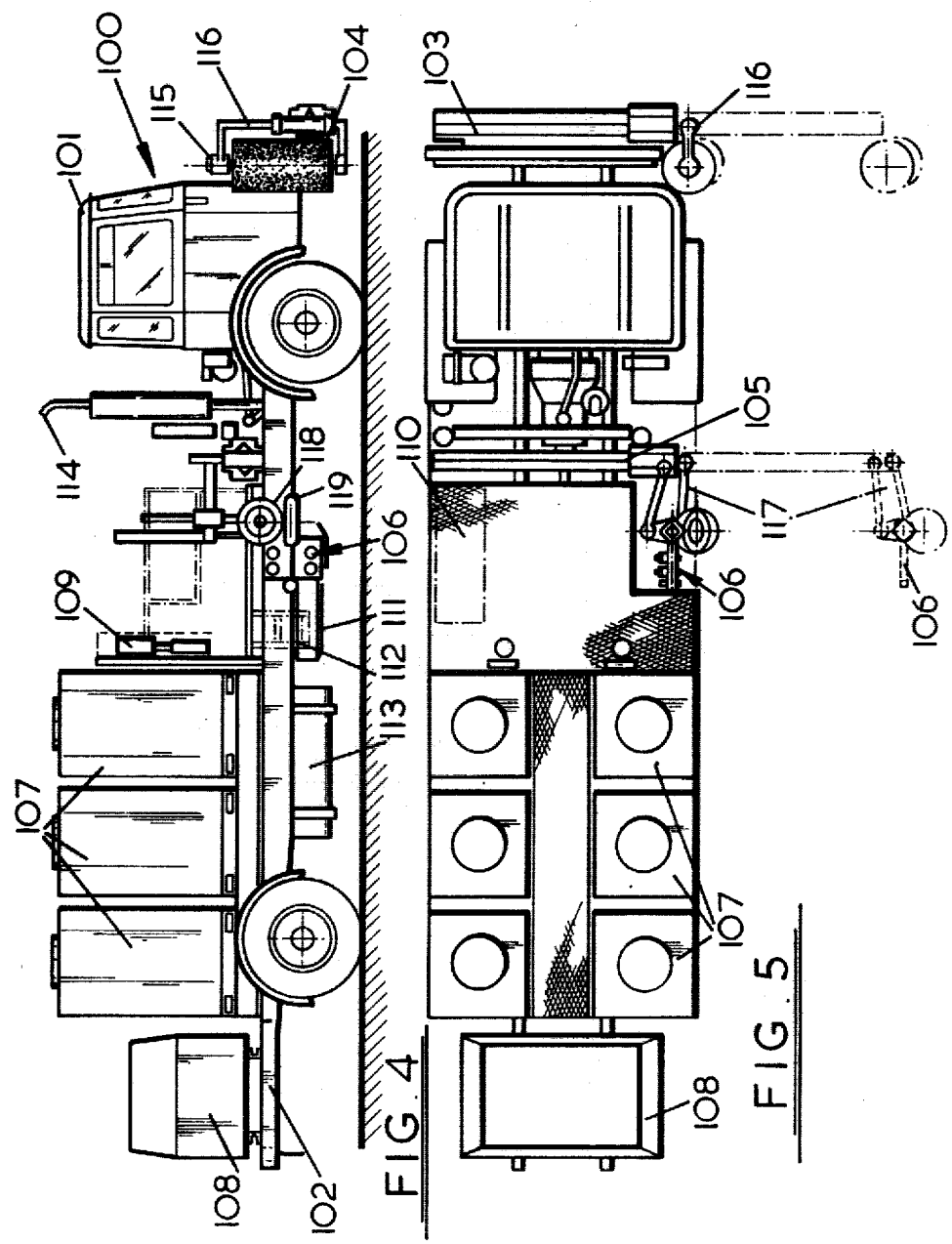

VEHICLE WITH SPRAY MEANS

The present invention relates to a vehicle for effecting a spraying operation onto an elongate structure, e.g. a roadway crash barrier, as the vehicle travels alongside said structure.

Many roadways are provided with crash barriers for safety purposes and/or for marking the line of the road. It is desirable that these barriers should be clearly visible to a motorist, but in practice they rapidly become dirty and may be difficult to see.

According to the present invention there is provided a motorised vehicle for effecting a spraying operation onto an elongate structure as the vehicle travels alongside said structure, the vehicle comprising an arm extendible transversely of the vehicle and provided with spray means for effecting said spraying operation associated with means for following the elongate structure, a tank for holding a medium to be sprayed by the spray means, and means for supplying said medium under pressure to the spray means.

The invention will be further described by way of example only with reference to the accompanying drawings, in which, FIG. 1 is a plan view of a first embodiment of vehicle for use in cleaning and/or painting a continuous length of a roadway crash barrier in accordance with the invention;

FIG. 4 is a side view of a second embodiment of vehicle in accordance with the invention for use in cleaning and/or painting a continuous length of a roadway crash barrier; and FIG. 5 is a plan view of the vehicle shown in FIG. 4.

Figure 1:
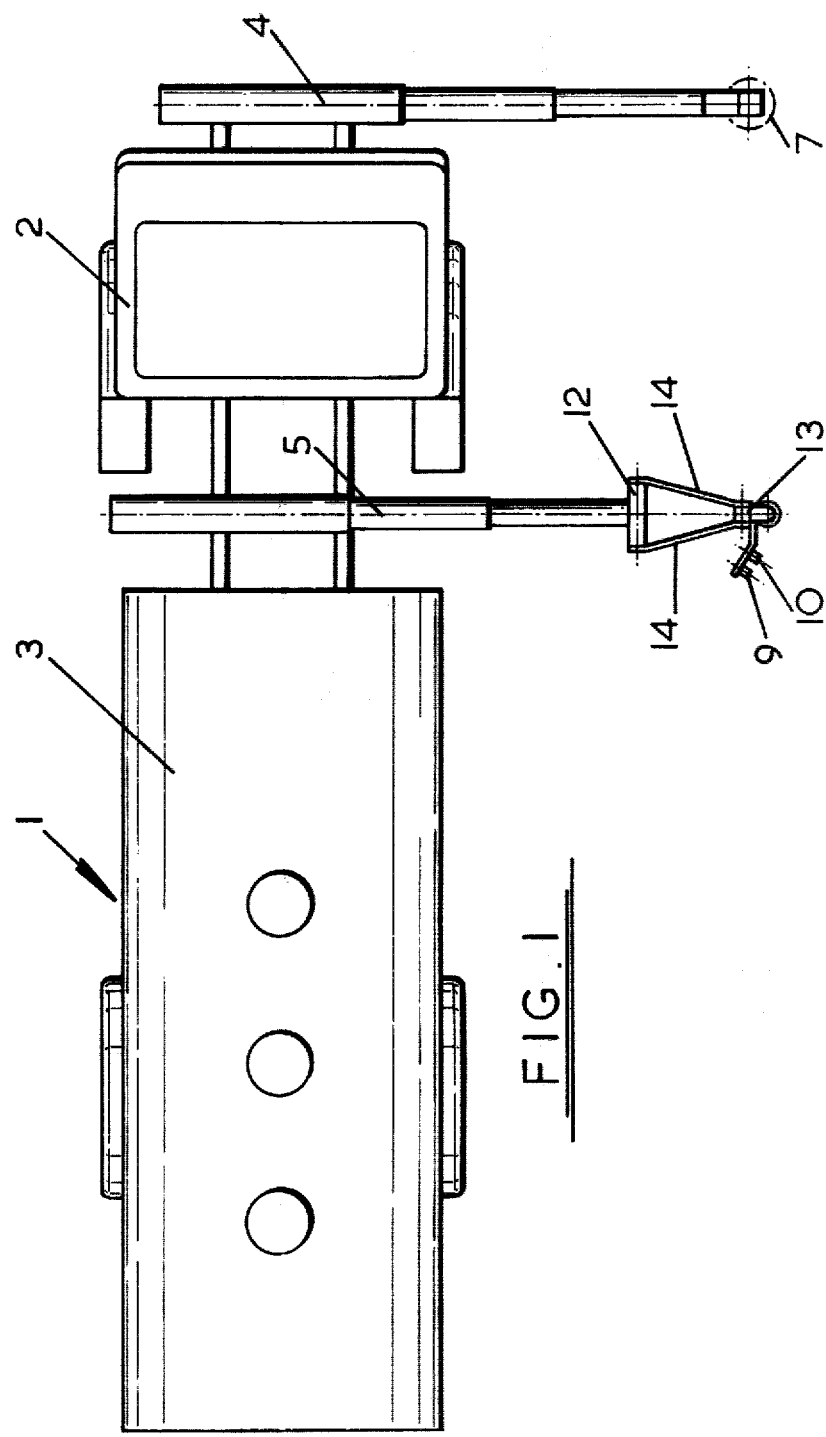

The drawings show a right hand drive tanker vehicle 1 having a driving cab 2 and a tank 3. The vehicle 1 is provided with a first telescopic arm 4 mounted on the front of the cab 2 and a second telescopic arm 5 mounted between the cab 2 and the tank 3, each of the arms 4 and 5 being capable of extending to the offside of the vehicle and being shown in their fully extended position.

The front telescopic arm 4 has at its end remote from the vehicle a generally U-shaped bracket 6 with vertically spaced limbs between which a vertically positioned cylindrical cleaning brush 7 is rotatably mounted. A pneumatic motor 8 is mounted on the upper limb of the bracket 6 for driving the brush 7 in a counter clockwise direction as viewed in plan. The brush 7 is used for cleaning a roadway crash barrier as the vehicle travels along and is preferably one having stiff bristles of synthetic plastics material providing the desired hard wearing characteristics.

The function of the vehicle 1 is, in addition to cleaning barriers with the brush 7, to steam clean or paint such barriers. It is necessary that the steam or paint are directed accurately towards the rail and for this purpose there are provided steam cleaning and/or painting nozzles 9 and 10 mounted on a barrier follower arrangement 11 itself provided on the arm 5. This arrangement comprises inner and outer supports 12 and 13 respectively connected by two pairs of upper and lower arms 14 and 15, the arms of each pair converging toward each other externally of the vehicle. The ends of the arms 14 and 15 are pivotally mounted on the supports 12 and 13, the latter carrying a follower roller 16 with frusto conical end portions 17. The top and bottom edges of the barrier (not shown) will locate against the inclined faces of the end portions 17 and the pivotal structure of the follower arrangement will allow the roller 16 to move vertically to follow undulating portions of the barrier. The nozzles 9 and 10 are mounted on the support 13 and thus move upwardly or downwardly in accordance with movements of the roller 16 thus ensuring that they are always directed towards the barrier.

Additionally a further nozzle (not shown) is provided on the lower arm 15 and is downwardly directed for spraying weedkiller onto a verge alongside the roadway.

The tank 3 is divided into a plurality of compartments, three shown in the drawings, each of which will hold paint, weedkiller or water as desired. A compressor (not shown) will be provided on the vehicle and will serve to supply water under pressure via a line (not shown) to the brush 7 to assist the cleaning operation. The compressor will also supply weedkiller to the appropriate spray nozzle. Additionally the compressor will supply paint to one of the nozzles 9 or 10, the other nozzle being supplied with pressurised hot water from a high pressure hot water supply (not shown). The compressor will also serve to operate the pneumatic motor 8 and to extend and retract the arms 4 and 5. Alternatively, if desired, a hydraulic supply can be provided for extending and retracting the arms 4 and 5. A system of controls will be provided in the driving cab permitting the driver to extend and retract the telescopic arms 4 and 5, to operate the motor 8 thus rotating the brush 7, and to supply steam or paint to the appropriate nozzles 9 or 10.

As indicated above the vehicle is for use in cleaning and/or painting a crash barrier provided, for example, between the carriageways of a motorway. For this purpose the arms 4 and 5 will be extended by a suitable distance so that, firstly, the brush 7 is positioned against the barrier, and, secondly, the upper and lower edges of the barrier locate against the frusto conical end portions 17 of the follower roller 16. The vehicle will travel along with the brush 7 being rotated whilst water is supplied thereto and paint or steam is selectively directed against the barrier. The vehicle thus enables a continuous length of barrier to be cleaned and/or painted in a continuous manner. Simultaneously, weedkiller can be sprayed onto a grass verge.

In a modification of the above described embodiment, two paint spray nozzles will be provided or alternatively the steam cleaning nozzle may be replaced by a paint spray nozzle. The vehicle may then carry two different colours of paint each of which is sprayed at different times thus allowing the barrier to be painted in successive sections of alternating colour.

FIGS. 4 and 5 show a second embodiment of vehicle in accordance with the invention. The vehicle illustrated in FIG. 4 is a right-hand drive lorry 100 with a driving cab 101 and a flat load carrying platform 102. The lorry 100 has a first telescopic arm 103 mounted on the front of the driving cab 101 and carrying a rotary brush 104, a second telescopic arm 105 mounted behind the driving cab 101 and carrying a spraying head unit 106, a plurality of removable tanks 107 on the platform 102, an air compressor 108 also mounted on the platform 102, a paint spray unit 109, and a high pressure washing unit 110. Additionally the lorry 100 has such conventional fixtures as a spare wheel 111, an access ladder 112, a fuel tank 113, and an exhaust 114.

The rotary brush 104, which is driven by an air motor 115 is mounted on the telescopic arm 103 by means of a bracket arrangement 116 which is biased outwardly of the lorry 100. This biasing ensures that, when the brush 104 is being used to clean a barrier, it will always act with constant force against the barrier, even if the line of the barrier is not straight. The various positions between which the brush 104 may be moved by the biased bracket 116 are shown in dashed-lines in FIG. 5.

The second telescopic arm 105 carries the spraying head unit 106 on a sprung pantograph unit 117 which incorporates a barrier follower arrangement including a wheel 118 disposed for rotation about a horizontal axis and a wheel 119 disposed for rotation about a vertical axis. The wheel 118 is for use where a box-section barrier is to be sprayed by the spraying head unit 106 (as described later) in which case the wheel 118 will run along the top of the box-section barrier. Alternatively the wheel 119 is for use where the barrier to be sprayed is of the Armco type (i.e. one of corrugated section) in which case the wheel 118 will run in a corrugation of the barrier. In either case, the wheel 118 or 119 as the case may be acts as a barrier follower.

In order that the spraying head unit 106 is always located the correct distance from the barrier being sprayed, it is necessary to ensure that the barrier follower (wheel 118 or 119) always acts with constant force against the barrier.

For this purpose, the pantograph unit 117 is associated with limit switches (not shown) and a control system (not shown) which are operative to extend or retract the arm 105 should the pantograph unit move more than a predetermined distance from its mean position. The application of the constant force is therefore achieved in two ways. Firstly, for minor deviations of the barrier, the pantograph unit 117 moves slightly to ensure that the barrier follower always applies a constant force to the barrier without extension or retraction of the arm 105. Secondly, for larger deviations of the barrier, the pantograph unit 117 will move by a greater amount and will move past the limit switches. The control system will then operate to extend or retract the arm 105 as necessary to ensure that the constant force is maintained.

The spray head unit 106 has three spray heads, one for paint, one for high pressure hot water and one for ballotini (reflective glass beads). It is of course possible to include additional spraying heads, e.g. a downwardly directed spray head one for spraying weedkiller.

The tanks 107 serve to store water, paint, ballotini and weedkiller as necessary. The tanks 107 are removable so that an empty tank may easily be lifted off the vehicle and replaced by a full tank.

A tank 107 holding paint will supply the paint through suitable tubing (not shown) to the paint spray unit 109 which will in turn supply the paint to the appropriate spraying head on the unit 106. Similarly, the high pressure washing unit 110 will be supplied with water from an associated tank 107.

Units will also be provided on the vehicle for supplying ballotini or weedkiller to the appropriate spray heads from the tanks 107.

The paint spray unit 109, the high pressure washing unit 110, the units for spraying ballotini and weedkiller, and also the air motor 115 are operated by the compressor. For this purpose, suitable air supply lines (not shown) and control units (not shown) will be provided.

Figure 2:
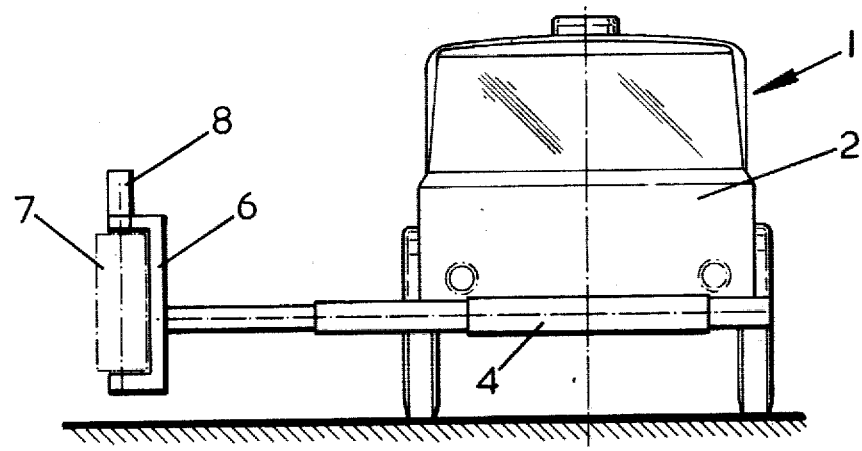
FIG. 2 is a front view of the vehicle shown in FIG. 1.
Figure 3:
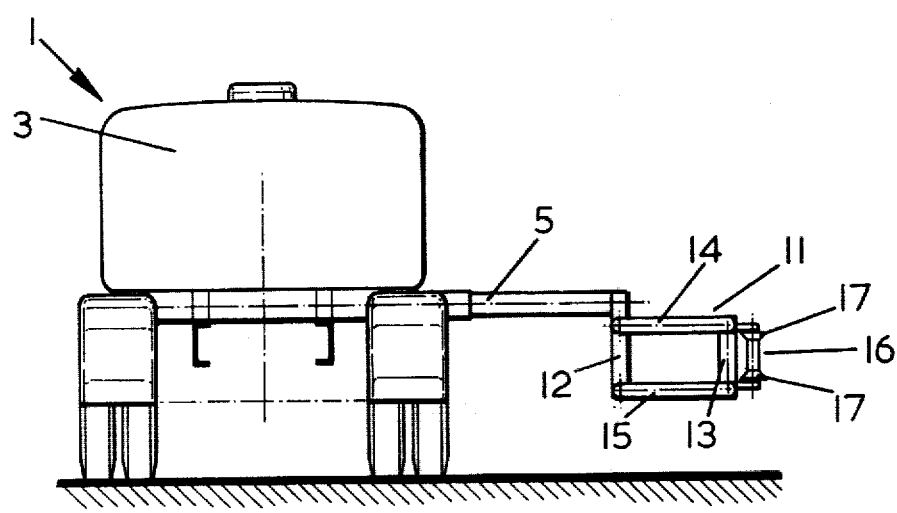
FIG. 3 is a rear view of the vehicle shown in FIG. 1.

It is of course possible to spray two colours of paint onto a barrier using the vehicle of FIGS. 4 and 5 in the same way as described for the vehicle of FIGS. 1 to 3.

What is claimed is:

1. A motorized vehicle for effecting a spraying operation onto an elongate structure as the vehicle travels alongside said structure, the vehicle comprising an arm extendable transversely of the vehicle and provided with spray means for effecting said spraying operation associated with means for following the elongate structure, a tank for holding a medium to be sprayed by the spray means, and means for supplying said medium under pressure to the spray means, said spray means being mounted on the arm by a trailing linkage movable between control position limits relative to the end of the arm, and said linkage being adapted to control extension or retraction of the arm when said position limits are reached.

2. A vehicle as claimed in claim 1 wherein said spray means is for spraying paint.

3. A vehicle as claimed in claim 1 wherein said spray means is for spraying high pressure hot water.

4. A vehicle as claimed in claim 1 wherein the extendable arm is provided with a plurality of spray means and the vehicle has a plurality of tanks each for holding a medium to be sprayed by one of said spray means.

5. A vehicle as claimed in claim 4 wherein one of said plurality of spray means is downwardly directed and is for spraying weedkiller.

6. A vehicle as claimed in claim 1 wherein the vehicle is provided with a compressor and the means for supplying said medium to the spray means is operated by the compressor.

7. A vehicle as claimed in claim 1 wherein the arm is telescopic.

8. A vehicle as claimed in claim 7 wherein the trailing linkage is a pantograph unit.

9. A vehicle as claimed in claim 8 wherein the means for following the elongate structure comprises two wheels mutually at right angles.

10. A vehicle as claimed in claim 1 wherein the vehicle is provided with a second extendable arm and said second arm is provided with a rotary cleaning brush mounted on a trailing linkage.

11. A vehicle as claimed in claim 10 wherein the rotary cleaning brush is mounted on a biased bracket assembly.

12. A vehicle as claimed in claim 10 wherein the rotary brush is driven by an air motor.

13. A vehicle as claimed in claim 1 wherein the or each tank is removable.

* * * * *